United States Patent
Poilasne et al.

(10) Patent No.: US 12,282,973 B2
(45) Date of Patent: Apr. 22, 2025

(54) VIRTUALIZED BATTERY RESOURCES FOR GRID SERVICE PARTICIPATION

(71) Applicant: Nuvve Corporation, San Diego, CA (US)

(72) Inventors: Gregory Poilasne, San Diego, CA (US); Hamza Lemsaddek, San Diego, CA (US)

(73) Assignee: Nuvve Corporation, San Diego, CA (US)

( * ) Notice: Subject to any disclaimer, the term of this patent is extended or adjusted under 35 U.S.C. 154(b) by 0 days.

(21) Appl. No.: 18/406,901

(22) Filed: Jan. 8, 2024

(65) Prior Publication Data

US 2024/0303752 A1 Sep. 12, 2024

Related U.S. Application Data

(63) Continuation of application No. 17/336,065, filed on Jun. 1, 2021, now abandoned.

(51) Int. Cl.
*G06Q 50/06* (2024.01)
*G05B 19/048* (2006.01)

(52) U.S. Cl.
CPC .......... *G06Q 50/06* (2013.01); *G05B 19/048* (2013.01); *G05B 2219/2639* (2013.01)

(58) Field of Classification Search
CPC .......... G06Q 50/06; G05B 19/048; G05B 2219/2639; H02J 2203/20; H02J 3/28
See application file for complete search history.

(56) References Cited

U.S. PATENT DOCUMENTS

| | | | |
|---|---|---|---|
| 4,617,506 A | 10/1986 | Bogie et al. |
| 4,770,841 A | 9/1988 | Haley et al. |
| 5,499,181 A | 3/1996 | Smith |
| 5,572,109 A | 11/1996 | Keith |
| 5,583,418 A | 12/1996 | Honda et al. |
| 5,598,084 A | 1/1997 | Keith |
| 5,767,584 A | 6/1998 | Gore et al. |
| 6,028,537 A | 2/2000 | Suman et al. |
| 6,081,205 A | 6/2000 | Williams |
| 6,087,806 A | 7/2000 | Fujioka |

(Continued)

FOREIGN PATENT DOCUMENTS

| | | |
|---|---|---|
| CA | 2697015 A1 | 1/2009 |
| CN | 1405944 A | 3/2003 |

(Continued)

OTHER PUBLICATIONS

Guille et al., "A conceptual framework for the vehicle-to-grid (V2G) implementation," Energy Policy, vol. 37, Issue 11, Nov. 2009, pp. 4379-4390.

(Continued)

*Primary Examiner* — Zhipeng Wang
(74) *Attorney, Agent, or Firm* — Snell & Wilmer L.L.P.

(57) ABSTRACT

Certain aspects of the present disclosure relate to virtualizing battery resources for grid service applications. In particular, some of these aspects provide a method for configuring a plurality of virtual energy storage devices in an energy storage device of a fixed energy storage system; and performing two or more grid services concurrently with two or more virtual energy storage devices of the plurality of virtual energy storage devices.

19 Claims, 9 Drawing Sheets

(56) References Cited

U.S. PATENT DOCUMENTS

| | | |
|---|---|---|
| 6,107,691 A | 8/2000 | Gore et al. |
| 6,356,877 B1 | 3/2002 | Schulden et al. |
| 6,614,204 B2 | 9/2003 | Pellegrino et al. |
| 6,925,361 B1 | 8/2005 | Sinnock |
| 7,013,205 B1 | 3/2006 | Hafner et al. |
| 7,040,430 B2 | 5/2006 | Nomura et al. |
| 7,274,975 B2 | 9/2007 | Miller |
| 7,443,049 B1 | 10/2008 | Jones et al. |
| 7,550,861 B2 | 6/2009 | Oyobe et al. |
| 7,565,224 B2 | 7/2009 | Fairlie et al. |
| 7,582,979 B2 | 9/2009 | Oyobe et al. |
| 7,590,472 B2 | 9/2009 | Hakim et al. |
| 7,612,466 B2 | 11/2009 | Skutt et al. |
| 7,740,092 B2 | 6/2010 | Bender et al. |
| 7,783,390 B2 | 8/2010 | Miller |
| 7,792,613 B2 | 9/2010 | Kressner et al. |
| 8,019,483 B2 | 9/2011 | Keefe |
| 8,116,915 B2 | 2/2012 | Kempton |
| 8,154,246 B1 | 4/2012 | Heitmann |
| 8,508,187 B2 | 8/2013 | Chiang et al. |
| 8,509,976 B2 | 8/2013 | Kempton |
| 9,043,038 B2 | 5/2015 | Kempton |
| 9,754,300 B2 | 9/2017 | Kempton et al. |
| 2004/0110044 A1 | 6/2004 | Mcarthur et al. |
| 2005/0107989 A1 | 5/2005 | Henriksen et al. |
| 2006/0250902 A1 | 11/2006 | Bender et al. |
| 2007/0068714 A1 | 3/2007 | Bender |
| 2007/0271006 A1 | 11/2007 | Golden et al. |
| 2007/0282495 A1 | 12/2007 | Kempton et al. |
| 2008/0039980 A1 | 2/2008 | Pollack et al. |
| 2008/0167756 A1 | 7/2008 | Golden et al. |
| 2008/0218104 A1 | 9/2008 | Lukic et al. |
| 2008/0281663 A1 | 11/2008 | Hakim et al. |
| 2009/0030712 A1 | 1/2009 | Bogolea et al. |
| 2009/0062967 A1 | 3/2009 | Kressner et al. |
| 2009/0088915 A1 | 4/2009 | Kizaki |
| 2009/0091291 A1 | 4/2009 | Woody et al. |
| 2009/0177595 A1 | 7/2009 | Dunlap et al. |
| 2009/0189456 A1 | 7/2009 | Skutt |
| 2009/0210357 A1 | 8/2009 | Pudar et al. |
| 2009/0222143 A1 | 9/2009 | Kempton |
| 2009/0224939 A1 | 9/2009 | Stocker et al. |
| 2009/0228388 A1 | 9/2009 | Axelrod et al. |
| 2009/0229900 A1 | 9/2009 | Hafner et al. |
| 2009/0259603 A1 | 10/2009 | Housh et al. |
| 2009/0313033 A1 | 12/2009 | Hafner et al. |
| 2009/0313103 A1 | 12/2009 | Ambrosio et al. |
| 2010/0017045 A1 | 1/2010 | Nesler et al. |
| 2010/0017249 A1 | 1/2010 | Fincham et al. |
| 2010/0114798 A1 | 5/2010 | Sirton |
| 2010/0161393 A1 | 6/2010 | Littrell |
| 2010/0161481 A1 | 6/2010 | Littrell |
| 2010/0211643 A1 | 8/2010 | Lowenthal et al. |
| 2010/0274570 A1 | 10/2010 | Proefke et al. |
| 2011/0001356 A1 | 1/2011 | Pollack |
| 2011/0099111 A1 | 4/2011 | Levy et al. |
| 2011/0202192 A1 | 8/2011 | Kempton |
| 2012/0029720 A1 | 2/2012 | Cherian et al. |
| 2012/0089523 A1 | 4/2012 | Hurri et al. |
| 2012/0253567 A1 | 10/2012 | Levy et al. |
| 2013/0039104 A1 | 2/2013 | Sharma |
| 2013/0113413 A1 | 5/2013 | Harty et al. |
| 2014/0018969 A1 | 1/2014 | Forbes |
| 2014/0039709 A1* | 2/2014 | Steven ............... H02J 13/00034 700/291 |
| 2014/0067151 A1 | 3/2014 | Erhart et al. |
| 2014/0304025 A1 | 10/2014 | Steven et al. |
| 2014/0312841 A1 | 10/2014 | Baba |
| 2015/0278968 A1* | 10/2015 | Steven ................... G06Q 50/06 705/7.35 |
| 2016/0248263 A1 | 8/2016 | Hunt et al. |
| 2017/0205865 A1* | 7/2017 | Hwang ................. G06Q 50/06 |
| 2018/0037121 A1 | 2/2018 | Narla |
| 2018/0239318 A1* | 8/2018 | Hwang ................. G06Q 50/06 |
| 2019/0050949 A1 | 2/2019 | Orsini |
| 2019/0184850 A1 | 6/2019 | Lee et al. |
| 2019/0288347 A1 | 9/2019 | Yokoyama et al. |
| 2020/0059097 A1* | 2/2020 | Bangalore ................ H02J 3/38 |
| 2020/0307402 A1 | 10/2020 | Poilasne |
| 2021/0011439 A1 | 1/2021 | Goverde et al. |
| 2021/0316637 A1 | 10/2021 | Slepchenkov et al. |
| 2022/0043038 A1 | 2/2022 | Matan |

FOREIGN PATENT DOCUMENTS

| | | |
|---|---|---|
| CN | 106203720 A | 12/2016 |
| JP | H07123599 A | 5/1995 |
| JP | 2003259636 A | 9/2003 |
| JP | 2003259696 A | 9/2003 |
| JP | 2005341646 A | 12/2005 |
| JP | 2006279844 A | 10/2006 |
| JP | 2007228695 A | 9/2007 |
| JP | 2007252118 A | 9/2007 |
| JP | 2007259600 A | 10/2007 |
| JP | 2007330083 A | 12/2007 |
| JP | 2007336778 A | 12/2007 |
| JP | 2008054439 A | 3/2008 |
| JP | 2008065635 A | 3/2008 |
| JP | 2009137456 A | 6/2009 |
| JP | 2009183086 A | 8/2009 |
| JP | 2009240150 A | 10/2009 |
| JP | 2009254052 A | 10/2009 |
| JP | 2010028913 A | 2/2010 |
| JP | 2010512727 A | 4/2010 |
| KR | 20150022732 A | 3/2015 |
| WO | 2006121761 A2 | 11/2006 |
| WO | 2007037972 A2 | 4/2007 |
| WO | 2008073476 A2 | 6/2008 |
| WO | 2009052446 A2 | 4/2009 |
| WO | 2008073453 A1 | 9/2009 |
| WO | 2011102855 A1 | 8/2011 |
| WO | 2011102856 A1 | 8/2011 |
| WO | 2018084152 A1 | 5/2018 |
| WO | 2020198689 A1 | 10/2020 |
| WO | 2022256184 A1 | 12/2022 |

OTHER PUBLICATIONS

Kempton, William, "Electric Vehicles as a New Power Source for Electric Utilities," Transportation Research Part D: Transport and Environment, vol. 2, Issue 3, Sep. 1997, pp. 157-175.

Kempton et al., "Vehicle-to-Grid Power: Battery, Hybrid, and Fuel Cell Vehicles as Resources for Distributed Electric Power in California," Prepared for California Air Resources Board and the California Environmental Protection Agency (under contract #ARB00-612, "Feasability of Electric Drive Vehicles as Distributed Power Generation Assets in California"), and Los Angeles Department of Water and Power, Electric Transportation Proa ram, in 94 paaes.

Kempton et al., "Vehicle-to-grid power fundamentals: Calculating capacity and net revenue," Journal of Power Sources, vol. 144, Issue 1, Jun. 1, 2005, pp. 268-279.

Kempton et al., "Vehicle-to-grid power implementation: From stabilizing the grid to supporting large-scale renewable energy," Journal of Power Sources, vol. 144, Issue 1, Jun. 1, 2005, pp. 280-294.

Meng et al., "Dynamic frequency response from electric vehicles considering travelling behavior in the Great Britain power system," Applied Energy, vol. 162, Nov. 12, 2015, pp. 966-979.

SAE International, "SAE Electric Vehicle and Plug in Hybrid Electric Vehicle Conductive Charge Coupler," SAE Standard J1772TM Jan. 2010, Issued Oct. 1996, Revised Jan. 2010, in 51 pages.

Tomic et al., "Using fleets of electric-drive vehicles for grid support," Journal of Power Sources, vol. 168, Mar. 12, 2007, pp. 459-468.

Wei et al., "The effect of different charging strategies on EV load frequency control," 2016 International Conference on Smart Grid and Clean Energy Technologies, IEEE, Oct. 19, 2016, pp. 161-165.

International Search Report and Written Opinion in corresponding International Patent Application No. PCT/US2022/030125, dated Sep. 27, 2022.

(56) References Cited

OTHER PUBLICATIONS

United States Patent and Trademark Office, Non-Final Office Action received in U.S. Appl. No. 17/336,065, dated Dec. 22, 2022.
United States Patent and Trademark Office, Final Office Action received in U.S. Appl. No. 17/336,065, dated Jul. 7, 2023.
United States Patent and Trademark Office, Advisory Action received in U.S. Appl. No. 17/336,065, dated Dec. 5, 2023.

* cited by examiner

VIRTUALIZED BATTERY RESOURCES FOR GRID SERVICE PARTICIPATION

INTRODUCTION

Aspects of the present disclosure relate to virtualizing battery resources for grid service applications.

Use of fixed energy storage (FES) systems (e.g., battery-based systems for residential or commercial use) is on the rise. For example, residential and commercial customers are using FES systems to better control charges for electricity use-especially in time-of-use billing environments. For this service, an FES may store energy during lower rate times of the day and deploy the energy during higher rate times of the day so that overall electric rates are reduced for a user.

Historically, FES systems have been deployed primarily for individual use. For example, individuals have added FES systems at their homes and companies have added FES systems at their commercial locations for rate shifting, back-up power, and other services. Such FES systems have not, however, been widely adopted for grid services. This is because FES systems operate like single power sources that are deployed for a specific service where the entire capacity of the FES is dedicated to that specific service. For example, if an FES system is configured for providing back-up power, it generally is not configured to provide any other services despite potentially having a very large power capacity.

Accordingly, there is a need for systems and methods for expanding the functionality of FES systems so that such systems can provide multiple services simultaneously.

BRIEF SUMMARY

Certain embodiments provide a method for providing FES-based grid services, including configuring a plurality of virtual energy storage devices in an energy storage device of a fixed energy storage system; and performing two or more grid services concurrently with two or more virtual energy storage devices of the plurality of virtual energy storage devices.

Another aspect provides a processing system, including: a memory comprising computer-executable instructions; one or more processors configured to execute the computer-executable instructions and cause the processing system to: configure a plurality of virtual energy storage devices in an energy storage device of a fixed energy storage system; and perform two or more grid services concurrently with two or more virtual energy storage devices of the plurality of virtual energy storage devices.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
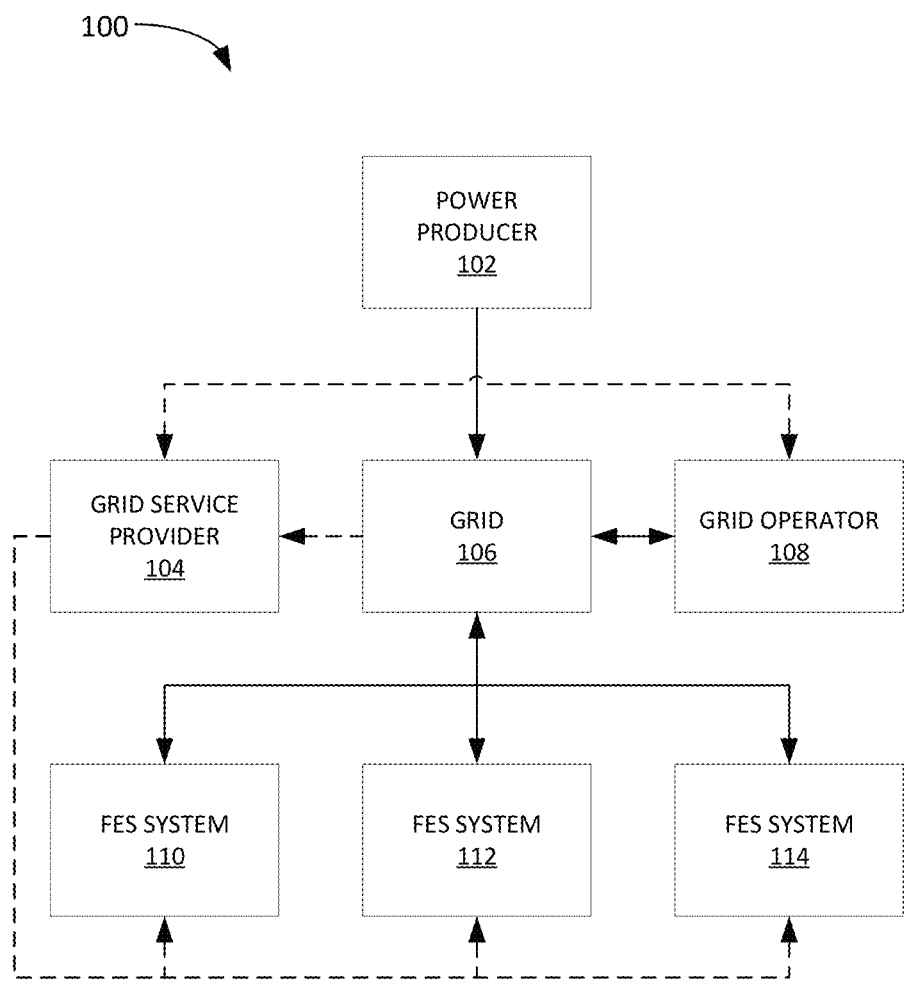
FIG. 1 depicts an example grid service system.

Aspects of the present disclosure provide systems and methods for virtualizing battery resources for grid service applications.

Grid services (including grid regulation services, ancillary services, distribution grid support, generation support, behind-the-meter optimization, and carbon optimization), may include a broad spectrum of services for maintaining optimal operation of an electric grid. Grid services may include, for example, scheduling and dispatch of electric power to a grid, reactive power and voltage control, loss compensation, load following, frequency control (e.g., frequency up and frequency down control), operating reserves, peak shaving, valley filling, capacity firming, demand response, and other grid services which support the grid.

Grid service providers generally bid on grid services based on characteristics of the grid-connected resources under their control, such as capacities of individual resources (e.g., energy storage device capacities), power flow capabilities (e.g., charge and discharge rate), expected times of availability, characteristics of the grid connection, and the like. However, when making bids for grid services, the grid service providers are constrained by uncertainty with respect to the availability and capacity of the resources in the aggregated pools.

Described herein are systems and methods for utilizing fixed energy systems (FES), such as fixed battery installations, to participate in grid services. In particular, unlike the conventional practice of having a single FES provide a single service, the systems and methods described herein provide for virtualizing the FES systems so that a single system may perform multiple services, including multiple grid services, simultaneously. This virtualization allows for a single, larger FES systems to perform the services of many smaller FES systems. Beneficially, the larger FES system may be more space and cost efficient, and less complex compared to coordination of many more individual, smaller FES systems.

For example, a single 1 MWh FES system configured to perform like five 200 kWh systems may be less expensive than five actual 200 kWh systems for various reasons. First, the control systems need not be duplicated across five 200 kWh FES systems and can instead be consolidated to the single 1 MWh FES system. Second, packaging and installation costs are reduced by having a single 1 MWh FES system versus five 200 kWh FES systems. Third, economies of scale may provide better cost for larger power capacities. Notably, here 1 MWh FES system and five 200 kWh FES systems is just one example, and many other configurations, sizes, etc. are possible.

The virtualization of a larger individual FES system to perform like many smaller FES systems provides other benefits. For example, the virtualization of the larger individual FES system need not be static. Instead, the partitioning of the larger individual FES system's capacity may be dynamic and respond to market opportunities. Thus, an example 1 MWh FES system may be dynamically partitioned into two 500 kWh virtual FES systems during a first period of time where larger capacities are needed in a market for grid services, and the same 1 MWh FES system may subsequently be dynamically partitioned into ten 100 kWh virtual FES systems during a second period of time when smaller capacities are needed for grid services. Moreover, the ability to partition the larger 1 MWh FES system into a dynamic number of smaller virtual FES systems allows for a dynamic number of grid services to be provided by the single FES system. In other words, the ability to dynamically create virtual FES systems of any size (up to the total capacity of the system) allows for extremely efficient provisioning of grid services. This is in contrast to conventional methods for utilizing FES systems for grid services where, for example, a 1 MWh FES systems would leave half its capacity unused when providing a 500 kWh grid service.

Example System for Providing FES-Based Grid Regulations Services

FIG. 1 depicts an example grid service system 100 configured for providing FES-based grid services.

Power producer 102 may be one or more utility-level power producers, such as power plants, for providing grid power. Though shown as a single entity, power producer 102 may be representative of a plurality of power production entities, such as power plants of different type (e.g., coal, gas, nuclear, hydro, wind, solar, geothermal, and others). Power producer 102 provides power to grid 106, including grids of all scales.

Grid operator 108 is representative of one or more regional transmission organizations (RTOs), transmission system operators (TSOs), distribution system operators (DSOs), and/or independent system operator (ISOs) (e.g., a microgrid operator) that coordinate, control, and monitor grid 106.

Grid operator 108 may provide economic incentive for grid service providers (e.g., 104) to provide grid services for grid 106 beyond what can be provided by power producer 102 or by grid operator 108. For example, while power producer 102 may be able to change power production over time using a variety of different power production capabilities, power producer 102 may not be able to provide load-based services or other rapid regulation services for grid 106.

Grid operator 108 may also request status information from grid service provider 104 as well as provide grid status information to grid service provider 104.

Grid service provider 104 may offer or "bid" on the opportunity to provide grid services for grid 106 to grid operator 108 based on the grid resources under its control. For example, grid service provider 104 may bid on a period of time in which it can provide electric load and/or supply to grid 106 via controllable grid-connected resources, such as FES systems 110, 112, and 114 in this example. Generally, FES systems, such as 110, 112, and 114, may be unidirectional (e.g., only able to absorb power or provide power), or bidirectional (e.g., able to absorb and provide power). If grid operator 108 accepts grid service provider 104's bid, thereby forming a grid service contract, it may subsequently send an electronic indication to grid service provider 104 (e.g., via a data network connecting the two) to commence providing grid services per the contract terms.

Grid service provider 104 may then commence providing grid services by controlling energy flow to and from various resources within its control. In the example depicted in FIG. 1, grid service provider 104 controls FES systems 110, 112, and 114.

Note that FES systems 110, 112, and 114 need not be collocated, and can in-fact be dispersed across significant distances. Aggregated FES resource pools may include hundreds or thousands or even more connected resources, and the ability to provide grid services may be enhanced as the total number of the FES resources increases.

FES systems 110, 112, and 114 are depicted as connected directly to grid 106; however, those systems may have integral equipment that controls power flows to and from those systems and which receives power control commands from grid service provider 104.

In some implementations, FES system 110, 112, and 114 may include a plurality of energy storage devices (e.g., batteries, battery packs, capacitors, and other types of energy storage) all electrically connected to an FES control system. In this way, collocated energy storage devices may be added modularly to an FES system without the need for redundant control equipment.

As depicted in FIG. 1, grid service provider 104 may send control signals, commands, instructions, or other data messages to FES systems 110, 112, and 114 along the indicated data flow lines. For example, grid service provider 104 may send control messages configured to control the flow of power to or from various FES resources to implement various grid services.

Grid service provider 104 may likewise receive data back from various FES resources along the indicated data flow lines. For example, grid service provider 104 may receive status information regarding FES resources (e.g., state of charge, total capacity, type of connection, environmental data such as temperature, charging and discharging capability, current configuration of virtual resources, and the like).

Notably, FIG. 1 depicts just one example of a system 100 for providing grid services and many others are possible. For example, different numbers of FES resources, or other types of energy storage resources, may be provided and organized in different fashions. Further, different arrangements of data and power flows may be provided as compared to the example in FIG. 1. The methods described herein work with systems configured like system 100 as well as other configurations.

Example Fixed Energy Storage Systems

Figure 2A:
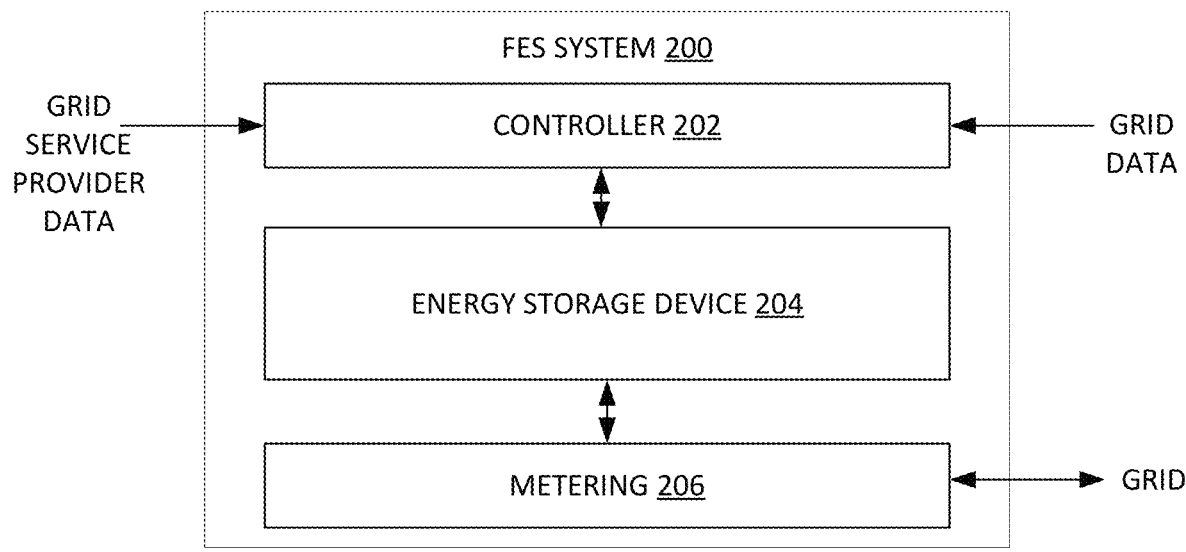
FIGS. 2A and 2B depict example configurations of a fixed energy storage system.
Figure 2B:
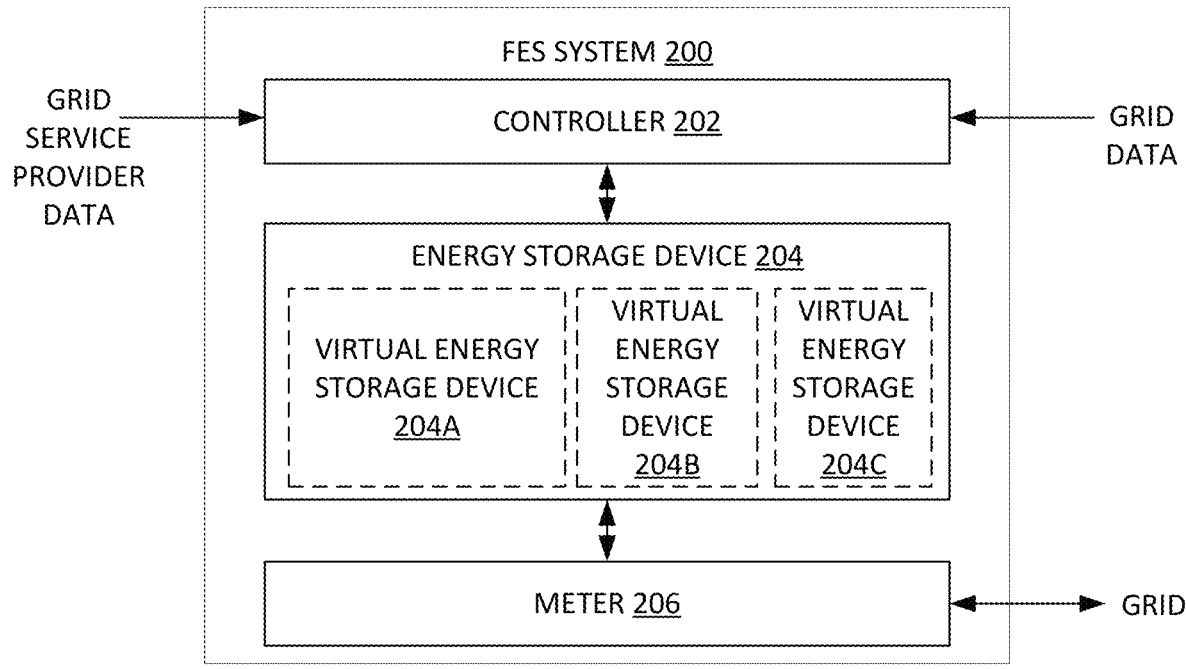

FIGS. 2A and 2B depict example configurations of a fixed energy storage (FES) system 200.

In particular, FIG. 2A depicts FES system 200 comprising a controller 202 configured to receive, for example, grid service provider data (such as indications to start or stop grid services, details in regards to the grid services to be performed, and the like), as well as to receive grid data, such as current grid operational parameters (e.g., load, demand, supply, voltage, frequency, etc.) and forecasted grid operational parameters. Notably, these are just two example of data that controller 202 may receive from external systems and data sources, but many other are possible. For example, controller 202 may also receive data from other FES systems (not depicted), other control systems, such as global FES system controllers, and the like.

Controller 202 is configured to control the operation of energy storage device 204 based on, for example, the grid service provider data and/or the grid data received by controller 202. For example, controller 202 may be configured to cause energy storage device 204 to receive power from the grid and to therefore act like a load in order to perform demand-based grid services, or to provide power to the grid, and therefore to perform supply-based grid services.

Energy storage device 204 may generally be any type of energy storage device architecture, such as one or more batteries, a battery pack, one or more capacitors, a kinetic energy storage device configured to exchange kinetic energy for electrical energy, a heat energy storage device configured to exchange heat energy for electrical energy, a chemical energy storage device configured to exchange chemical energy for electrical energy, or any other electrical energy storage device or combination of the aforementioned energy storage devices.

FES system 200 further includes meter 206, which is configured to perform electrical metering functions for energy provided to the grid for supply-side grid services and taken off the grid for load-based grid services. For example, meter 206 may be configured to measure the cumulative amount of power provided to or from energy storage device 204 for grid services, the power flow rate, the power flow time, the voltage, the frequency, and various other aspects. Note that while meter 206 is depicted as separate in FIGS. 2A and 2B, meter 206 may be implemented as part of controller 202 in other embodiments. For example, controller 202 may include a data connection to one or more meters provided to meter flow from energy storage device 204 to the grid.

In some embodiments, controller 202 may receive data from meter 206 and provide that data to a grid operator (e.g., 108 of FIG. 1) to show fulfillment of a grid service.

While controller 202 and energy storage device 204 are depicted as collocated in FIGS. 2A and 2B, this need not be the case. For example, an energy storage device, such as 204, may be installed in an outdoor enclosure while a control system may be located elsewhere, such as within a building. Controller 202 need only be in data communication with energy storage device 204 in order to control its operation, regardless of whether controller 202 is collocated or remote from energy storage device 204.

FIG. 2B depicts FES system 200 configured with a plurality of virtual energy storage devices 204A-C comprised within energy storage device 204. Beneficially, controller 202 may partition energy storage device 204 logically into two or more virtual energy storage devices without the underlying physical implementation being changed. Thereafter, each of virtual energy storage devices 204A-C may be configured to perform grid services individually.

Each virtual energy storage device may be defined by various characteristics, such as a total capacity (e.g., 100 kWh) for providing load and/or supply, energy flow rates (e.g., charging and discharging rates), voltage capabilities, frequency capabilities, a response time (e.g., an amount of time to achieve a certain rate of energy flow), availability times (e.g., during certain times of the day, or certain days, and the like), and others. Notably, various virtual energy storage devices within a single FES system (e.g., 200) need not have the same characteristics; their characteristics need only be consistent with the underlying capability of energy storage device 204.

The virtualization of energy storage device 204 not only allows for a single energy storage device to perform multiple concurrent grid services, but it allows for energy storage device 204 to perform like a multi-tenant system despite being a single physical storage system. Thus, for example, an owner of FES system 200 may provision various virtual energy storage devices (e.g., 204A-C) to different users at different times and reconfigure the boundaries of the virtual energy storage devices in a flexible, dynamic fashion.

In some embodiments, a virtual energy storage (e.g., 204A-C) device may be associated with one or more physical aspects of energy storage device 204, such as one or more batteries in a multi-battery energy storage device. However, this need not be the case, and generally virtual energy storage devices (e.g., 204A-C) may be defined logically based on the total capacity of the underlying energy storage device (e.g., 204) without regard for the physical implementation of the energy storage device.

Example Grid Regulation with Virtual Energy Storage Devices

Figure 3:
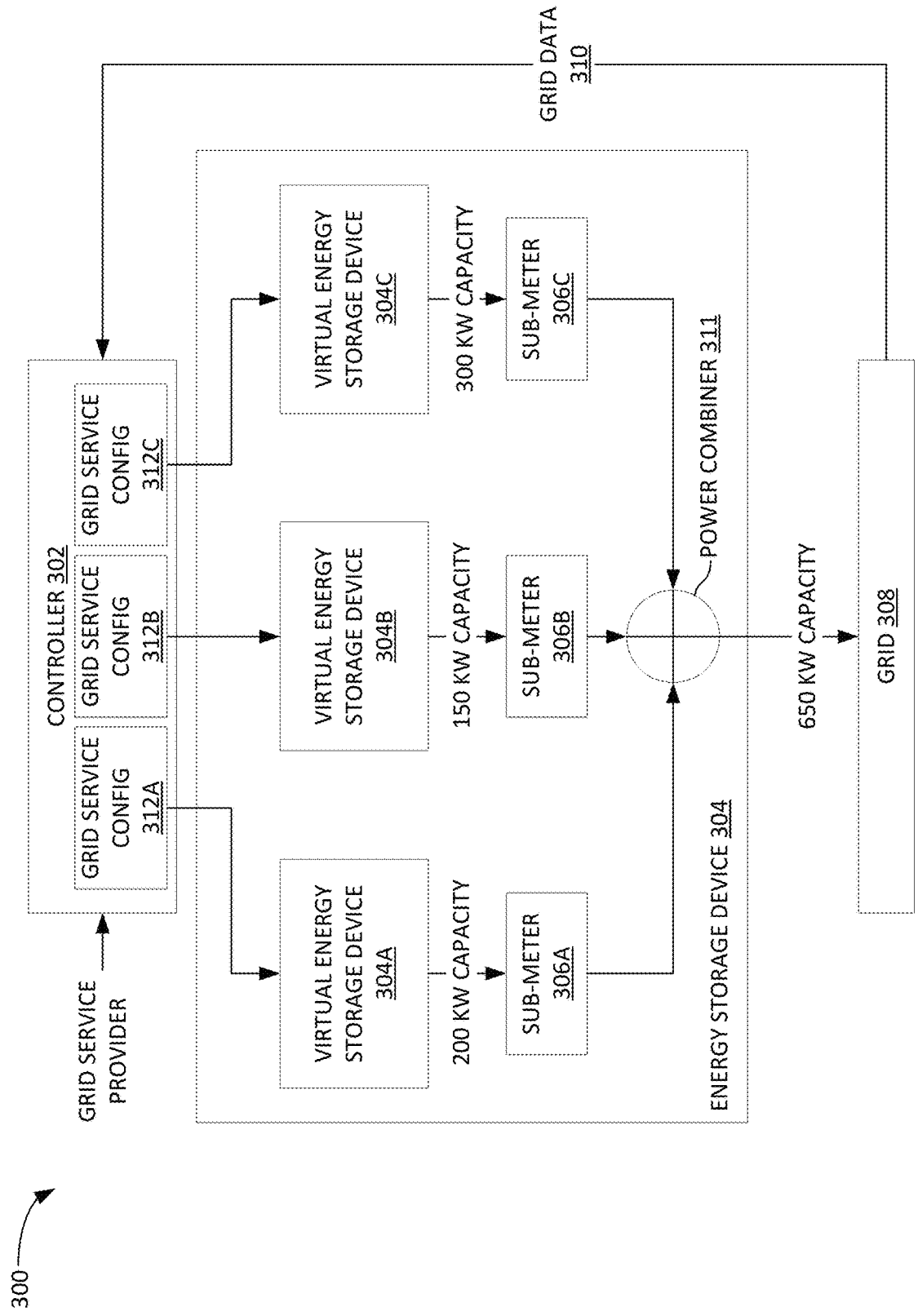
FIG. 3 depicts an example of a fixed energy storage system providing a supply-based grid service.

FIG. 3 depicts an example of a fixed energy storage (FES) system 300 providing supply-based grid services.

In this example, controller 302 stores grid service configurations 312A-C, which may relate to grid services that have been contracted by an operator of FES system 300, such as grid service provider 104 in FIG. 1. Grid service configurations may generally include, for example, the type of grid service to be performed (e.g., a load or supply-based grid service), the time period that the grid service is to be performed during (e.g., a single or recurring time period with a start and end time), the capacity of the grid service, the response time of the grid service (e.g., providing some amount of energy load or supply within a set response time), the grid connection to which the grid service is to be provided, and the like.

In some cases, each of the grid service configurations may relate to a different "user" of FES system 300, such as in a multi-tenant implementation.

Controller 302 may generally activate or enable various grid services based on instructions or indications received from a grid service provider and/or based on operational characteristics of the grid received as part of grid data 310 and based on the grid service configurations (e.g., 312A-C).

Further in this example, virtual energy storage devices 304A-C have each been configured to service one of the grid service configurations 312A-C. In particular, virtual energy storage device 304A is configured to provide up to 200 KW of supply to grid 308, virtual energy storage device 304B is configured to provide up to 150 KW of supply to grid 308, and virtual energy storage device 304C is configured to provide up to 300 KW of supply to grid 308. Thus, when all three virtual energy storage devices 304A-C are providing their grid services, energy storage device 304 provides 650 KW of supply to grid 308 via power combiner 311 such as physical or virtual (e.g., software) which is capable of aggregating the power from multiple subsystems.

Here, energy storage device 304 has at least 650 KW of supply capacity allocated to virtual energy storage devices 304A-C, but may also have additional capacity for further virtual energy storage devices. In this way, multiple grid services may be provided concurrently using a single energy storage device 304, which is beneficial compared to allocating energy storage device 304 to any single grid service, which would leave significant capacity of energy storage device 304 unused.

Note that it is possible to implement multiple virtual energy storage devices (e.g., related to multiple grid service configurations), which exceed the total capacity of the energy storage device so long as the grid service configurations do not implement or enable the virtual energy storage devices at the same time. For example, assume that energy storage device 304 has 1000 KW of supply capacity. Two virtual energy storage devices may be configured, each with 750 KW of supply capacity, but controller 302 may not enable the two virtual energy storage devices at once. Rather, they may be enabled at different times to avoid exceeding the capacity of energy storage device 304. Generally, controller 302 may not allow concurrent grid services that exceed the physical capabilities of energy storage device 304.

In this example, each virtual energy storage device 304A-C is associated with a sub-meter, 306A-C, respectively. Each sub-meter 306A-C may measure or otherwise keep track of the flow of power to or from virtual energy storage devices 304A-C. Note that sub-meters 306A-C need not be implemented as part of energy storage device 304, but are depicted in this fashion for clarity. In other embodiments, controller 302 may implement and monitor virtual energy storage device-specific sub-meters, which may be virtualized in various embodiments.

Figure 4:
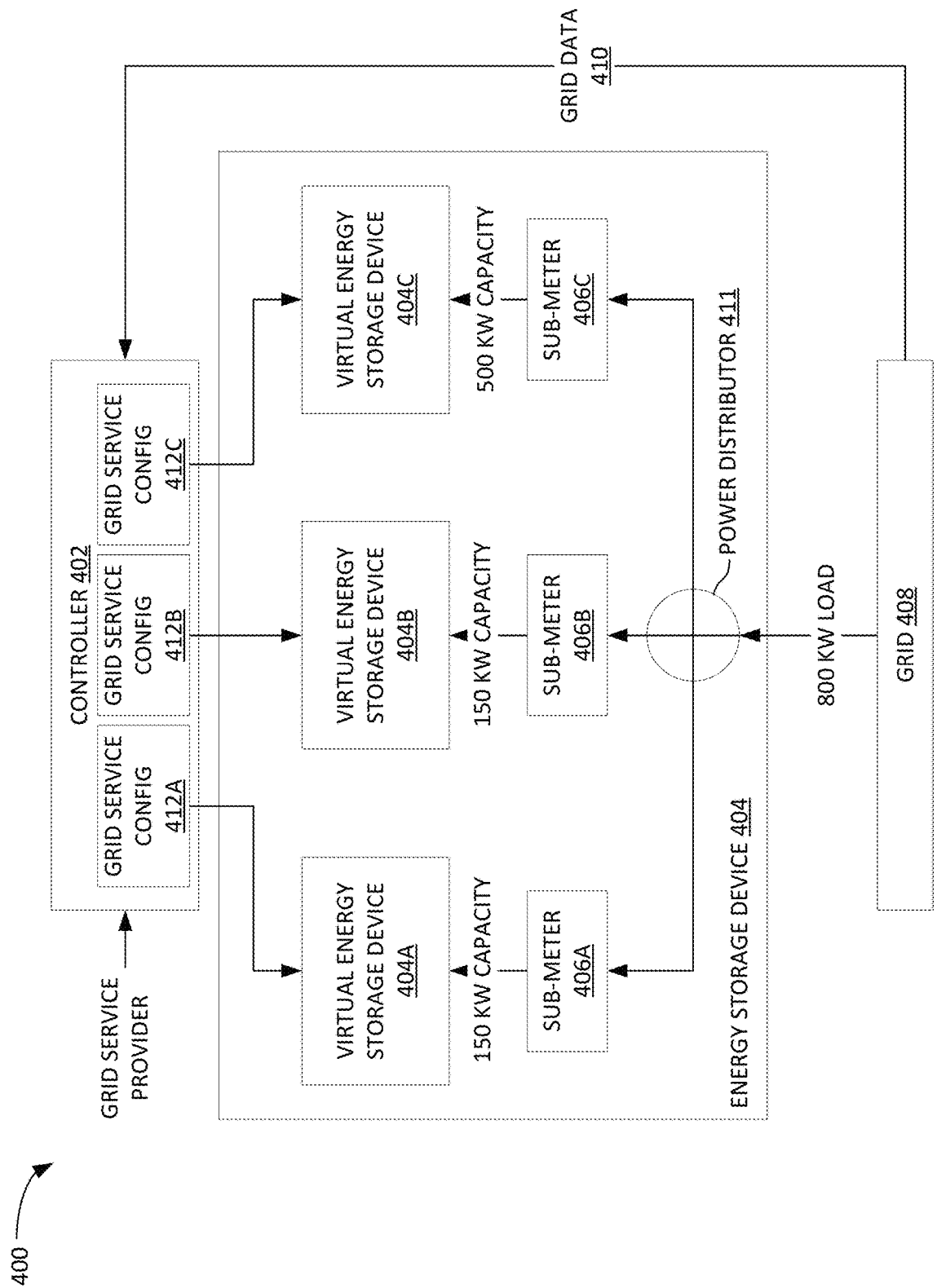
FIG. 4 depicts another example of a fixed energy storage system providing load-based grid services.

FIG. 4 depicts another example of a fixed energy storage (FES) system 400 providing load-based grid services.

Similar to FIG. 3, here controller 402 stores grid service configurations 412A-C, which relate to grid services configured to be performed by FES system 300.

Here, grid service configurations 412A-C generally define load-based grid services, and virtual energy storage devices 404A-C have each been configured to service one of the grid service configurations 412A-C. In particular, virtual energy storage device 404A is configured to provide up to 150 KW of load to grid 408, virtual energy storage device 404B is configured to provide up to 150 KW of load to grid 408, and virtual energy storage device 404C is configured to provide up to 500 KW of load to grid 408. Thus, when all three virtual energy storage devices 404A-C are providing their grid services, energy storage device 404 provides 800 KW of load to grid 408 via power distributor 411 such as physical or virtual (e.g., software) which is capable of deaggregating the power from the grid into multiple subsystems.

As in the example of FIG. 3, here each virtual energy storage device 404A-C is associated with a sub-meter, 406A-C that is configured to measure or otherwise keep track of the flow of power to or from virtual energy storage devices 404A-C.

Figure 5:
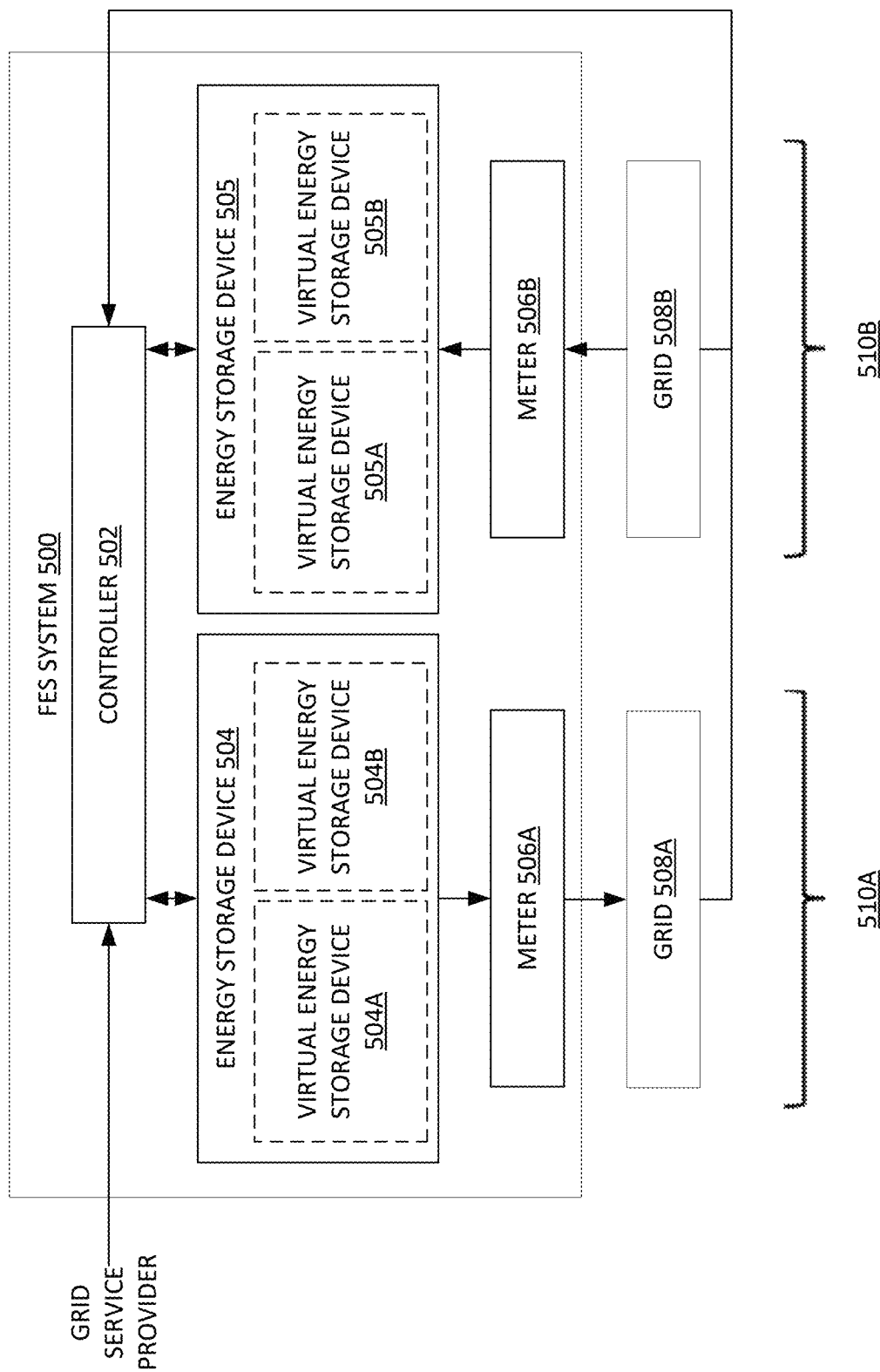
FIG. 5 depicts an example fixed energy storage system comprising multiple energy storage devices configured to provide different grid services.

FIG. 5 depicts an example fixed energy storage (FES) system 500 comprising multiple energy storage devices configured to provide different grid services.

In the depicted example, controller 502 is configured to control energy storage devices 504 and 505 in the same manners as described previously with respect to FIGS. 2B-4; however, FIG. 5 depicts additional capabilities when multiple energy storage devices are controllable at once.

For example, while a given energy storage device can be configured to perform both supply and load-based grid services based on one or more virtual energy storage devices, it cannot generally provide both types of services simultaneously because the action of one virtual energy storage device providing one service, such as load, may effectively cancel out all or some of another virtual energy storage device providing an opposite service, such as supply.

However, where multiple energy storage devices (e.g., 504 and 505) are under the control of the controller (e.g., 502), multiple grid services can be organized by type among the energy storage devices. For example, in the example of FIG. 5, energy storage device 504 is configured by controller 502 to handle supply-based grid services using virtual energy storage devices 504A and 504B (e.g., in the same manner as described with respect to FIG. 3). Energy storage device 505 is configured by controller 502 to handle demand-based grid services using virtual energy storage devices 505A and 505B. Note that while grid service configurations are not depicted in FIG. 5, the grid services performed by FES 500 may likewise be based on such configurations as described above.

In some embodiments, controller 502 may receive a plurality of grid service configurations and dynamically allocate them to energy storage devices (e.g., 504 and 505) based on service type (e.g., load-based service or supply-based service). As above, it is possible to configure grid services of opposing type on one energy storage device, but the opposing types cannot operate concurrently. In the embodiment of FIG. 5, the controller 502 may enable concurrent grid services of opposing types by allocating the services of different types to different energy storage devices.

In some embodiments, controller 502 may account for the total capacities of various energy storage devices in deciding where to configure various virtual energy storage devices for various grid services. For example, if energy storage device 504 has 500 KW of capacity and energy storage device 505 has 1000 KW of capacity, and controller 502 has grid service configurations for 350 KW of supply and 750 KW of load, then the load-based configuration(s) 510B will be configured on the energy storage device with 1000 KW of capacity, and the supply-based configuration(s) 510A will be configured on the energy storage device with 500 KW of capacity.

Each of energy storage devices 504 and 505 is connected to a meter, 506A and 506B, respectively, which is configured as above to meter the flows of energy to and from the energy storage devices. Though not depicted in FIG. 5, meters 506A and 506B may implement virtual sub-meters for each virtual energy storage device, as described above.

Further, in this example, energy storage devices 504 and 505 are connected to separate grids, 508A and 508B. In some embodiments, these separate grids may be, for example, a connection to a local area grid, such as a house or a building, as well a connection to a wide area grid, such a mains or utility power grid. In other embodiments, these separate grids may instead be two different connections to the same grid, whether local or wide area.

Generally, the number of energy storage devices, virtual energy storage devices, grid connections, and controllers depicted in FIG. 5 are for illustrative purpose only, and other configurations with more or fewer of each aspect are possible. For example, energy storage devices 504 and 505 may be controlled by separate controllers that cooperate in other embodiments.

Figure 6:
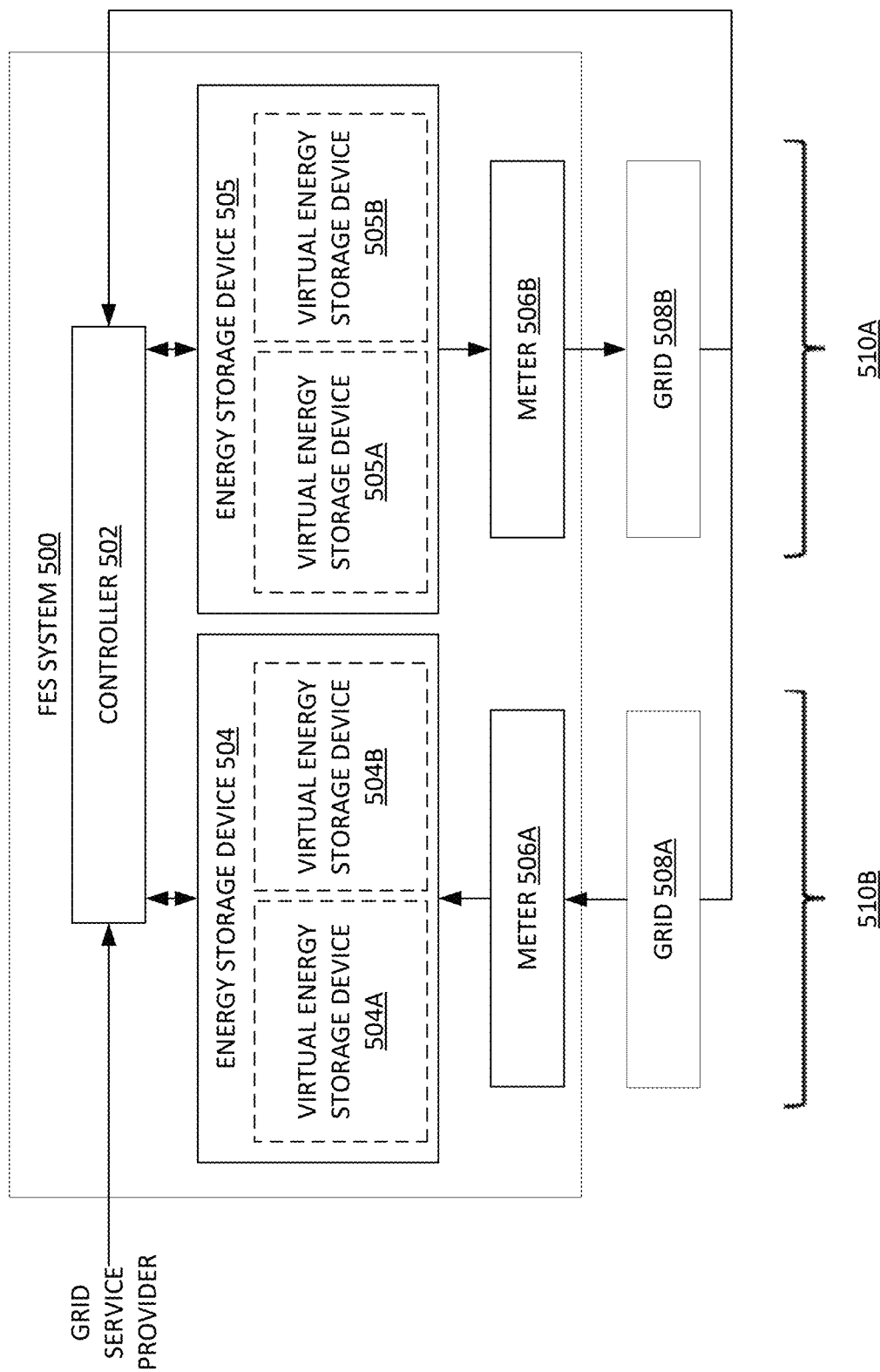
FIG. 6 depicts another example fixed energy storage system comprising multiple energy storage devices configured to provide different grid services.

FIG. 6 depicts another configuration of the fixed energy storage (FES) system 500 having a reversed configuration of energy storage devices 504 and 505 for various grid services. For example, if energy storage device 504 has 500 KW of capacity and energy storage device 505 has 1000 KW of capacity, and controller 502 has grid service configurations for 350 KW of load and 750 KW of supply, then the supply-based configuration(s) 510A will be configured on the energy storage device with 1000 KW of capacity, and the load-based configuration(s) 510B will be configured on the energy storage device with 500 KW of capacity. In other words, energy storage devices 504 and 505 are sharable and can have dynamical allocations and assignments in the fixed energy storage (FES) system 500.

Figure 7:
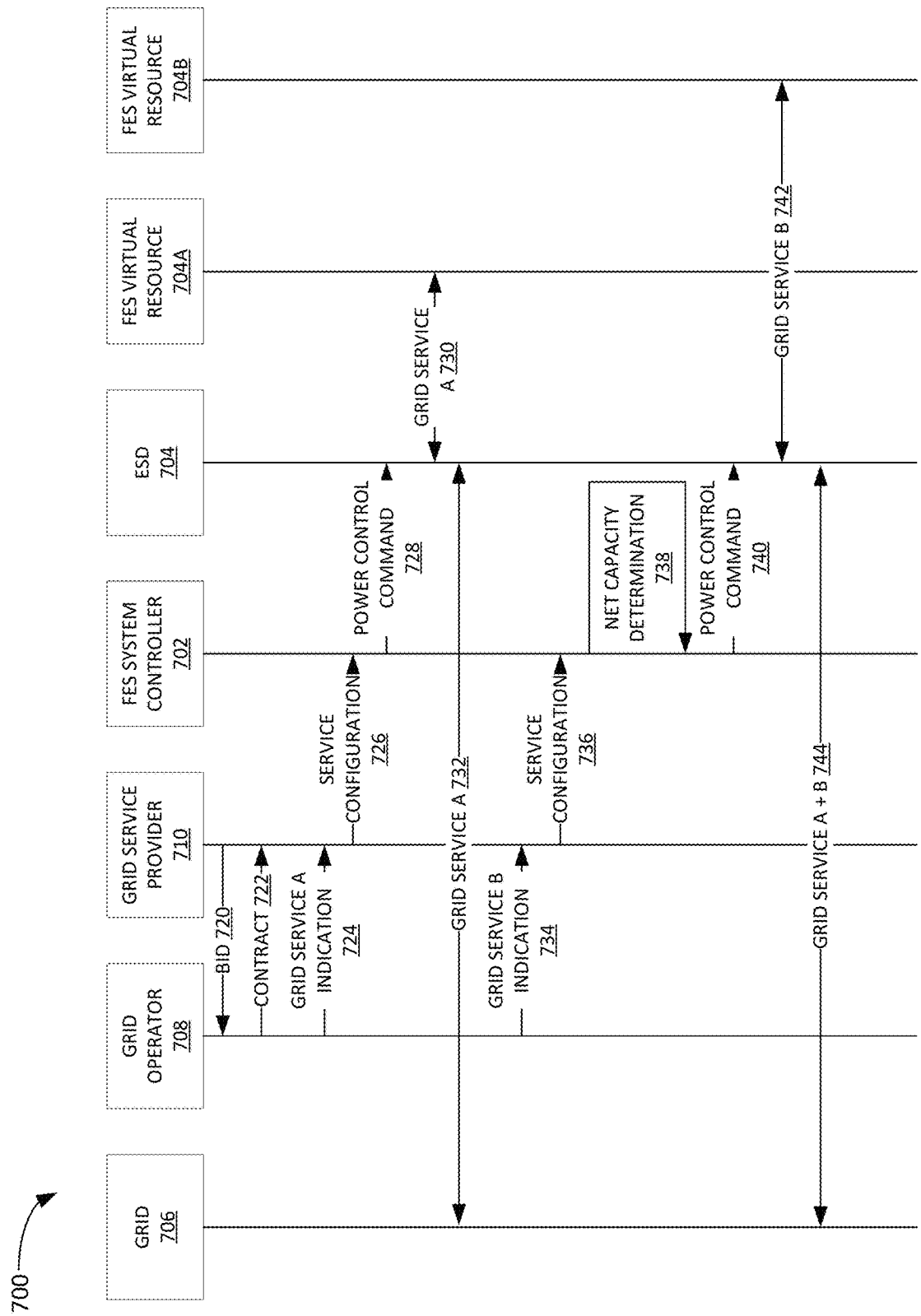
FIG. 7 depicts an example flow for providing grid services using virtual energy storage devices.

Example Flow Diagram for Providing Grid Services with Virtual Energy Storage Devices FIG. 7 depicts an example flow 700 for providing grid services using virtual energy storage devices, such as described herein.

Flow 700 begins at step 720 with a grid service provider 710 bidding for a grid service contract with grid operator 708. The grid service may be a load or supply-based grid service as generally described herein.

Flow 700 then proceeds to step 722 with a contract between, for example, the grid service provider 710 and grid operator 708, being formed for a grid service. The contract may generally include the type of grid service (e.g., supply or load), the time the service is to be supplied (or to be available for supply), energy characteristics of the grid service, such as total supply or load capacity, response rate, voltage, frequency, and the like.

Flow 700 then proceeds to step 724 with grid operator 708 providing a grid service indication for a grid service (grid service A) to grid service provider 710. The grid service indication may be any sort of signal, data, electronic message, or the like, which indicates to grid service provider 710 that it needs to enable the contracted grid service A.

Flow 700 then proceeds to step 726 with grid service provider 710 providing a service configuration for grid service A to FES system controller 702 (e.g., 202, 302, 402, and 502 described with respect to FIGS. 2, 3, 4, 5 and 6, respectively).

Flow 700 then proceeds to step 728 with FES system controller 702 providing a power control command to energy storage device (ESD) 704. The power control command could be, for example, to supply load to the grid (e.g., by charging a battery of energy storage device 704), or to provide a supply to the grid (e.g., by discharging a battery of energy storage device 704).

Flow 700 then proceeds to step 730 with virtual energy storage device 704A of energy storage device 704 providing grid service A, and then energy storage device 704 providing the same grid service A to grid 706 at 732. Note that grid 706 does not "see" the grid service as coming from virtual energy storage device 704A, but rather as coming from energy storage device 704. Thus, the flow 730 between virtual energy storage device 704A and energy storage device 704 is merely for demonstrating the concept.

Flow 700 then proceeds to step 734 with grid operator 708 providing another grid service indication for another grid service (grid service B) to grid service provider 710. In this example, grid service B has already been contracted between grid service provider 710 and grid operator 708.

Flow 700 then proceeds to step 736 with grid service provider 710 providing a service configuration for grid service B to FES system controller 702.

Flow 700 then proceeds to step 738 with controller 702 performing a net capacity determination to ensure that the configurations for grid service A and grid service B can operate concurrently. For example, the net capacity determination may ensure that providing grid services A and B concurrently will not exceed a design constraint or physical constraint of energy storage device 704.

Upon determining that grid service A and B may be provided concurrently by energy storage device 704, flow 700 then proceeds to step 740 with FES system controller 702 providing a power control command to energy storage device 704.

Flow 700 then proceeds to step 742 with virtual energy storage device 704B of energy storage device 704 providing grid service B, and then energy storage device 704 providing the grid service A and grid service B concurrently to grid 706 at 744. Here again, grid 706 does not "see" the grid service as coming from virtual energy storage devices 704A and 704B, but rather as coming from energy storage device 704.

Note that the particular order of the steps, the number and type of grid services and virtual energy storage devices, the types of data flows and messages, and other aspects of FIG. 7 are just one possible example, and many others are possible consistent with the various embodiments described herein.

For example, in some cases the grid service configurations may be provided to controller 702 at the time of entering a contract for a grid service rather than after receiving the grid service indication as in the example of FIG. 7. As another example, rather than receiving a grid service indication as in steps 724 and 734, grid service provide 710 may monitor operational characteristics of the grid, such as the grid voltage and/or frequency, and respond with grid services independently without need for an indication from grid operator 708. As yet another example, the net capacity determination at step 738 may not be necessary where a controller performs such a check upon configuring grid services that may overlap in time.

Example Method of Performing Grid Services Using Virtual Energy Storage Devices

Figure 8:
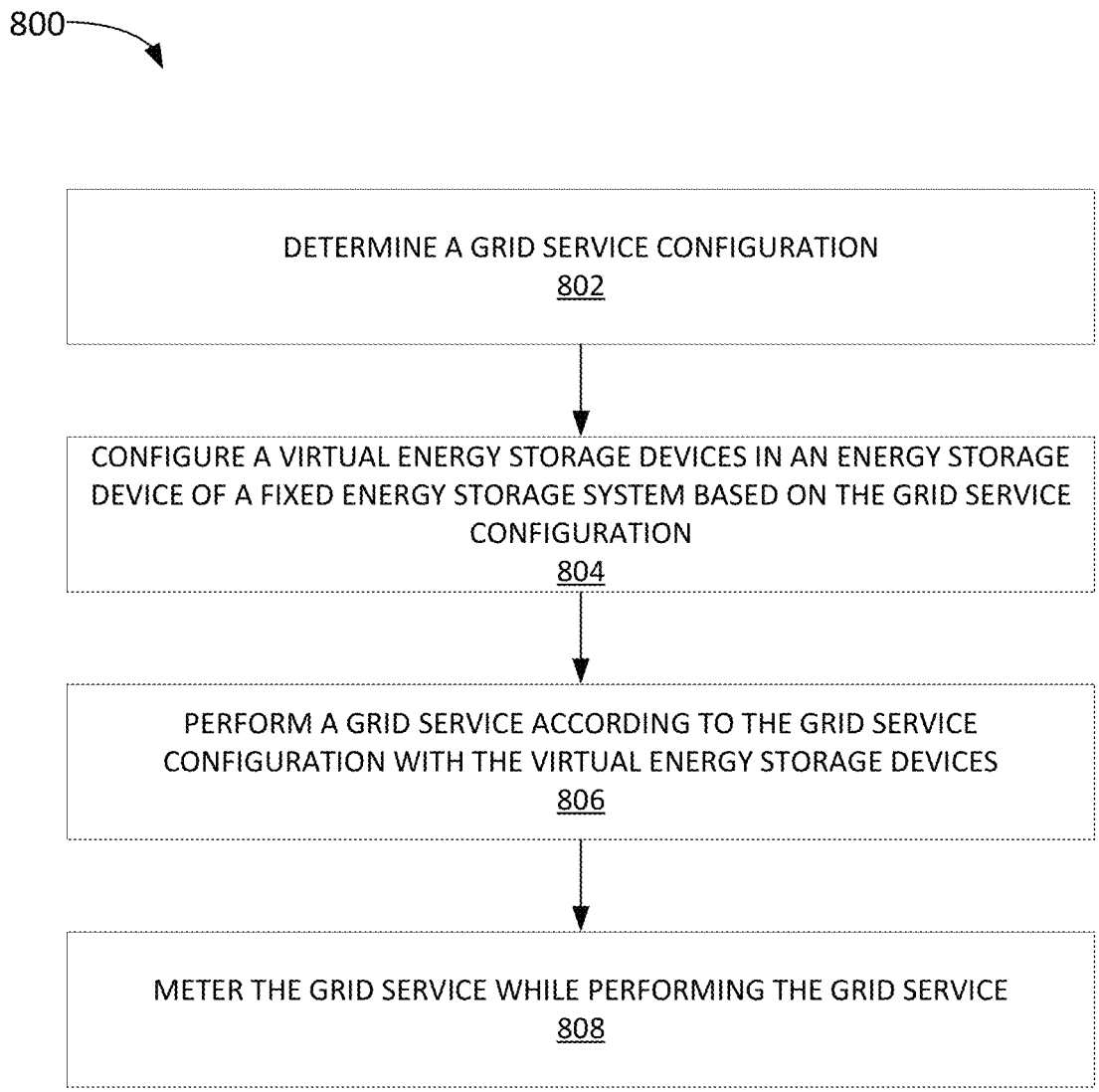
FIG. 8 depicts an example method of performing grid services using virtual energy storage devices.

FIG. 8 depicts an example method 800 of performing grid services using virtual energy storage devices, such as described herein.

Method 800 begins at step 802 with determining a grid service configuration. As above, a grid service configuration may generally define the characteristics of a grid service to be performed by a grid service provider, such as the type of grid service to be performed (e.g., a load or supply-based grid service), the time period that the grid service is to be performed during (e.g., a single or recurring time period with a start and end time), the capacity of the grid service, the response time of the grid service (e.g., providing some amount of energy load or supply within a set response time), the grid connection to which the grid service is to be provided, and the like.

Method 800 the proceeds to step 804 with configuring a virtual energy storage device in an energy storage device of a fixed energy storage system based on the grid service configuration, such as described with above with respect to FIGS. 3-6.

Method 800 then proceeds to step 806 with performing a grid service according to the grid service configuration with the virtual energy storage device. In some embodiments, initiating the performance of the grid service may be based on receiving an indication from a grid operator to begin performance of the grid service. In other embodiments, initiating the performance of the grid service may be based on monitoring operational characteristics of the grid, such as by monitoring a voltage or frequency of the grid.

Note that while step 806 refers to performing a single grid service according to the grid service configuration, as described above with respect to FIGS. 3-7, method 700 may further include configuring multiple virtual energy storage devices based on multiple grid service configurations and performing multiple grid services simultaneously. As above, a benefit of the virtual energy storage devices is the ability to utilize the capacity of a single energy storage device, or a single fixed energy storage system comprising multiple energy storage devices, to perform multiple concurrent grid services regardless of the number of underlying physical energy storage devices.

Method 800 then proceeds to step 808 with metering the grid service while performing the grid service. As above, metering may generally include capturing temporal and operational aspects of the grid service being performed, such as start time, end time, time period, amount of power received or delivered, voltage of power received or delivered, frequency of power received or delivered, grid connection from which the power was received or to which the power was delivered, electrical storage device (or devices) that performed the grid service, virtual electrical storage device (or devices) that performed the grid service, fixed energy storage system that performed the grid service, rate plan(s) or tariff(s) while performing the grid service, and others.

In some embodiments, the metering data may be provided to a grid operator as proof that a grid service contract was fulfilled by a grid service provider.

Example Fixed Energy Storage Processing System

Figure 9:
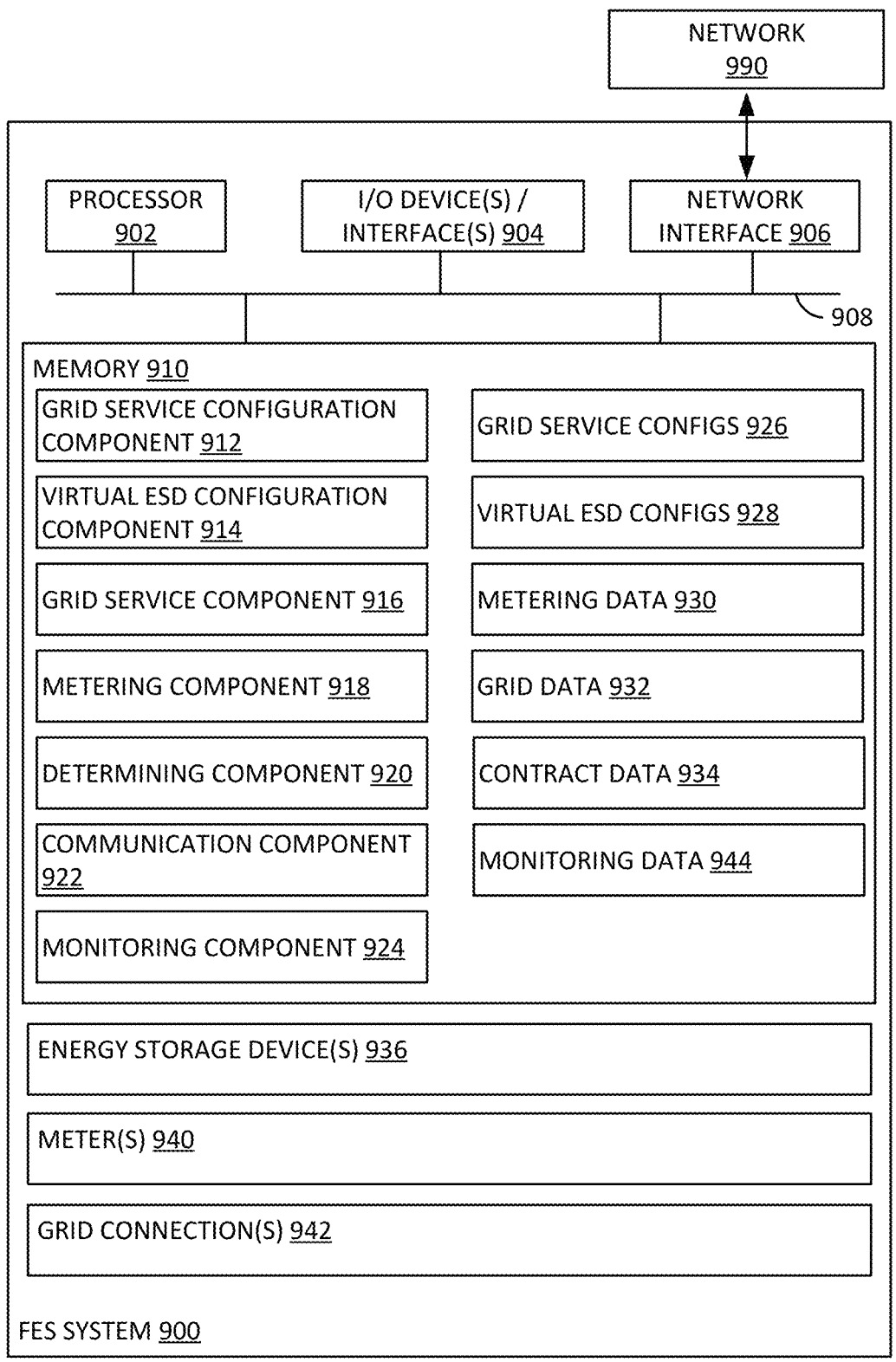
FIG. 9 depicts an example fixed energy storage processing system.

FIG. 9 depicts an example fixed energy storage (FES) processing system 900 configured to perform the processes and methods described herein, including with respect to FIGS. 7 and 8. FES processing system 900 may be used by a grid service provider to provide grid services, as described herein.

FES processing system 900 includes a processor 902 configured to access data in memory 910 via, for example, bus 908. While shown as a single memory 810 for simplicity in this example, memory 910 may be representative of multiple memories accessible to processor 902.

Processor 902 is further configured to exchange data with I/O devices and related interfaces 904 as well as with network 990 via network interface 906. Network 990 is representative of any sort of data communication network, including wired and wireless networks, such as local area networks (LANs), wide area networks (WANs), the internet, private networks, and the like.

Processor 902 is further configured to execute computer-executable instructions for performing functions associated with grid service configuration component 912, virtual energy storage device (ESD) configuration component 914, grid service component 916, metering component 918, determining component 820, communication component 922, and monitoring component 924 in this example. For example, processor 902 is configured to execute non-transitory computer-executable instructions associated these components to perform the functions and methods described above with respect to FIGS. 2B-8.

Grid service configuration component 912 may generally be configured to generate grid service configurations, such as described above with respect to FIGS. 3-4.

Virtual ESD configuration component 914 may generally configure virtual energy storage device configurations, such as described above with respect to FIGS. 2B-6.

Grid service component 916 may generally be configured to perform grid services using virtual energy storage devices based on, for example, virtual energy storage device configurations 928 and grid service configurations 926.

Metering component 918 may generally be configured to meter characteristics of a grid service being performed, such as those described above.

Determining component 920 may generally be configured to perform various determinations for performing grid services, such as those described herein.

Communication component 922 may generally be configured for sending and receiving data, such as exchanging data with grid operators and grid service providers.

Monitoring component 924 may generally be configured to monitor operational characteristics of FES system 900 as well as to monitor operational characteristics of one or more grid connections 942, such as those described herein.

Processor 902 is further configured to access data associated with the various components, such as grid service configuration(s) 926, virtual ESD configurations 928, metering data 930, grid data 932, contract data 934, and monitoring data 944. Notably, the aforementioned components and data types are just one example, and others are possible consistent with the various embodiments described herein.

While processor 902 is depicted as a single processor in this example, processor 902 is meant to be representative of one or more processors, including in some examples different types of processors working together (e.g., a central processing unit (CPU) and a graphical processing unit (GPU), digital signal processors (DSP), field programmable gate array (FPGA), or other type of processor). Further, in some examples, FES processing system 900 may be implemented across multiple devices, such as in a cloud-computing implementation, where various physical resources, such as processors, memories, and storage are virtualized.

FES processing system 900 may perform grid service by interfacing with, receiving data from, and sending data to grid service providers and grid operators, such as described above with respect to FIG. 1.

FES processing system 800 also includes one or more energy storage devices 936, such as those described herein. Energy storage device(s) 936 may be, for example, one or more batteries, a battery pack, one or more capacitors, a kinetic energy storage device configured to exchange kinetic energy for electrical energy, a heat energy storage device configured to exchange heat energy for electrical energy, a chemical energy storage device configured to exchange chemical energy for electrical energy, or any other electrical energy storage device or combination of the aforementioned energy storage devices. In some embodiments, monitoring component 924 may be configured to monitor various operational or performance characteristics of energy storage device(s) 936, such as temperature, energy capacity, charge and discharge rates, charge and discharge cycles, and other characteristics.

FES processing system 800 also includes one or more meter(s) 940, which may be configured to measure various electrical aspects of FES system 900, including power flow amount, power flow direction, voltage, frequency, time, and the like. Meter(s) 940 may generally store metering data 930 in memory 910. In some embodiments, meter(s) 940 may include local and remote meters, including meters operated by another entity, such as a grid operator. Such remote meters may interface with FES system 900 via network 990 and provide metering data 930.

FES processing system 900 also includes one or more grid connection(s) 942, such as described with respect to FIG. 5 or FIG. 6.

Note that FES processing system 900 is just one embodiment, and other embodiments may include more or fewer aspects, or aspects arranged and/or configured in different ways consistent with the various embodiments described herein.

Example Clauses

Implementation examples are described in the following numbered clauses:

Clause 1: A method, comprising: configuring a plurality of virtual energy storage devices in an energy storage device of a fixed energy storage system; and performing two or more grid services concurrently with two or more virtual energy storage devices of the plurality of virtual energy storage devices.

Clause 2: The method of Clause 1, further comprising: determining a plurality of grid service configurations, wherein each virtual energy storage device of the plurality of virtual energy storage devices is associated with one grid service configuration of the plurality of grid service configurations.

Clause 3: The method of Clause 2, wherein determining the plurality of grid service configurations comprises receiving the grid service configurations from a grid service provider.

Clause 4: The method of any one of Clauses 1-3, further comprising metering each grid service of the two or more grid services separately while performing the two or more grid services concurrently.

Clause 5: The method of any one of Clauses 1-4, further comprising: receiving an indication from a grid service provider associated with each grid service of the two or more grid services; and enabling each grid service of the two or more grid services in response to the received indication.

Clause 6: The method of any one of Clauses 1-5, further comprising: monitoring a grid for one or more operational characteristics; and enabling each grid service of the two or more grid services in response to the one or more operational characteristics.

Clause 7: The method of Clause 6, wherein one of the one or more operational characteristics is a voltage of the grid or a frequency of the grid.

Clause 8: The method of any one of Clauses 1-7, wherein: the two or more grid services are a same type of grid services, and the type is one of a supply-based grid service or a load-based grid service.

Clause 9: The method of any one of Clauses 1-8, wherein the two or more grid services are of different types of grid services.

Clause 10: The method of any one of Clauses 2-9, wherein each grid service configuration of the plurality of grid service configurations comprises: a type of grid service; a capacity of a grid service; and a time period of a grid service.

Clause 11: The method of any one of Clauses 2-10, wherein: the plurality of grid service configurations comprise a first subset of grid service configurations associated with a load-based grid service and a second subset of grid service configurations associated with a supply-based grid service, and the plurality of virtual energy storage devices in the energy storage device are associated with either grid service configurations in the first subset of grid service configurations or the second subset of grid service configurations, but not both.

Clause 12: The method of Clause 11, wherein a plurality of energy storage devices are associated with either grid service configurations in the first subset of grid service configurations or the second subset of grid service configurations.

Clause 13: A processing system, comprising: a memory comprising computer-executable instructions; one or more processors configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium comprising computer-executable instructions that, when executed by one or more processors of a processing system, cause the processing system to perform a method in accordance with any one of Clauses 1-12.

Clause 16: A computer program product embodied on a computer-readable storage medium comprising code for performing a method in accordance with any one of Clauses 1-12.

Other Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing grid services, the method comprising:
   configuring, by one or more controllers, a first energy storage device from a fixed energy storage system into a first set of virtualized energy storage devices of a demand-based configuration, each of the first set of virtualized energy storage devices configured to be controlled individually;
   configuring, by the one or more controllers, a second energy storage device from the fixed energy storage system into a second set of virtualized energy storage devices of a supply-based configuration, each of the second set of virtualized energy storage devices configured to be controlled individually;
   controlling, by the one or more controllers and through each of the first set of virtualized energy storage devices of the demand-based configuration, demand-based grid services to a first of one or more grids; and
   controlling, by the one or more controllers and through each of the second set of virtualized energy storage devices of the supply-based configuration, supply-based grid services to one of the first of the one or more grids or a second of the one or more grids;
   wherein the controlling the demand-based grid services and the controlling the supply-based grid services are performed concurrently.

2. The method of claim 1, further comprising:
   receiving, by the one or more controllers and from a grid operator, instructions to perform the demand-based grid services and the supply-based grid services for a period of time; and
   responsive to the receiving the instructions, performing the controlling the demand-based grid services and the controlling the supply-based grid services for the period of time.

3. The method of claim 1, further comprising:
   receiving, by the one or more controllers and from a grid operator, an indication to begin performance of the demand-based grid services and the supply-based grid services; and
   responsive to the receiving the indication, initiating, by the one or more controllers, performance of the demand-based grid services and the supply-based grid services by the configuring the first energy storage device and the configuring the second energy storage device.

4. The method of claim 3, wherein prior to the configuring the first energy storage device and the configuring the second energy storage device, the method further comprises:
   receiving, by the one or more controllers, a supply capacity for the supply-based configuration and a demand capacity for the demand-based configuration; and
   determining the first energy storage device will be configured into the first set of virtualized energy storage devices of the demand-based configuration and the second energy storage device will be configured into the second set of virtualized energy storage devices of the supply-based configuration based at least in part on the demand capacity, the supply capacity, a first capacity of the first energy storage device, and a second capacity of the second energy storage device.

5. The method of claim 4, wherein:
   the first capacity of the first energy storage device is greater than the second capacity of the second energy storage device,
   the demand capacity is greater than the supply capacity;
   the first capacity of the first energy storage device is greater than the demand capacity,
   the second capacity of the second energy storage device is greater than the supply capacity, and
   the demand capacity is greater than the second capacity of the second energy storage device.

6. The method of claim 4, wherein:
   the first capacity of the first energy storage device is less than the second capacity of the second energy storage device,
   the demand capacity is less than the supply capacity;
   the first capacity of the first energy storage device is greater than the demand capacity,
   the second capacity of the second energy storage device is greater than the supply capacity, and
   the supply capacity is greater than the first capacity of the first energy storage device.

7. The method of claim 1, wherein:
   the first energy storage device is configured behind-the-meter relative to a first energy meter, and
   the second energy storage device is configured behind-the-meter relative to a second energy meter.

8. The method of claim 7, further comprising:
configuring the first energy meter into a first set of virtualized energy meters, each of the first set of virtualized energy meters corresponding to one of the first set of virtualized energy storage devices; and
configuring the second energy meter into a second set of virtualized energy meters, each of the second set of virtualized energy meters corresponding to one of the second set of virtualized energy storage devices.

9. The method of claim 1, wherein:
the configuring the first set of virtualized energy storage devices comprises partitioning the first energy storage device logically into the first set of virtualized energy storage devices without an underlying physical implementation of the first energy storage device being changed, and
the configuring the second set of virtualized energy storage devices comprises partitioning the second energy storage device logically into the second set of virtualized energy storage devices without an underlying physical implementation of the second energy storage device being changed.

10. The method of claim 1, wherein the demand-based grid services are performed on the first of the one or more grids.

11. The method of claim 1, wherein the supply-based grid services are performed on the second of the one or more grids.

12. The method of claim 11, wherein the first of the one or more grids is one of a local area grid or a wide area grid, and wherein the second of the one or more grids is another of the local area grid or the wide area grid.

13. The method of claim 1, further comprising receiving, by the one or more controllers and from a grid operator, an input including the demand-based configuration and the supply-based configuration.

14. The method of claim 13, further comprising:
selecting, by the one or more controllers and based on a first characteristic of the demand-based configuration, the first energy storage device to be configured into the first set of virtualized energy storage devices; and
selecting, by the one or more controllers and based on a second characteristic of the supply-based configuration, the second energy storage device to be configured into the second set of virtualized energy storage devices.

15. The method of claim 14, wherein the first energy storage device and the second energy storage device are selected from a plurality of energy storage devices that form the fixed energy storage system.

16. The method of claim 1, wherein responsive to the controlling the demand-based grid services to the first of the one or more grids, each of the first set of virtualized energy storage devices provides a load to the first of the one or more grids.

17. The method of claim 1, wherein responsive to the controlling the supply-based grid services to the one of the first of the one or more grids or the second of the one or more grids, each of the second set of virtualized energy storage devices provides a supply to the one of the first of the one or more grids or the second of the one or more grids.

18. A processing system, comprising:
a memory comprising computer-executable instructions;
one or more processors configured to execute the computer-executable instructions and cause the processing system to:
configure, by one or more controllers, a first energy storage device from a fixed energy storage system into a first set of virtualized energy storage devices of a demand-based configuration, each of the first set of virtualized energy storage devices configured to be controlled individually;
configure, by the one or more controllers, a second energy storage device from the fixed energy storage system into a second set of virtualized energy storage devices of a supply-based configuration, each of the second set of virtualized energy storage devices configured to be controlled individually;
control, by the one or more controllers and through each of the first set of virtualized energy storage devices of the demand-based configuration, demand-based grid services to a first of one or more grids; and
control, by the one or more controllers and through each of the second set of virtualized energy storage devices of the supply-based configuration, supply-based grid services to one of the first of the one or more grids or a second of the one or more grids;
wherein the demand-based grid services and the supply-based grid services are controlled, by the one or more controllers, concurrently.

19. A method, comprising:
configuring a plurality of virtual energy storage devices in first energy storage device and a second energy storage device of a fixed energy storage system by partitioning each of the first energy storage device and the second energy storage device logically into two or more virtual energy storage devices respectively; and
performing, by a performing step, two or more grid services concurrently with the plurality of virtual energy storage devices, wherein the performing step comprises:
configuring the first energy storage device to handle supply-based grid services, wherein a power combiner aggregates power from the two or more virtual energy storage devices associated with the first energy storage device to a grid for the supply-based grid services; and
configuring the second energy storage device to handle demand-based grid services, wherein a power distributor de-aggregates power from the grid into the two or more virtual energy storage devices associated with the second energy storage device for the demand-based grid services.

* * * * *